Figure 1:
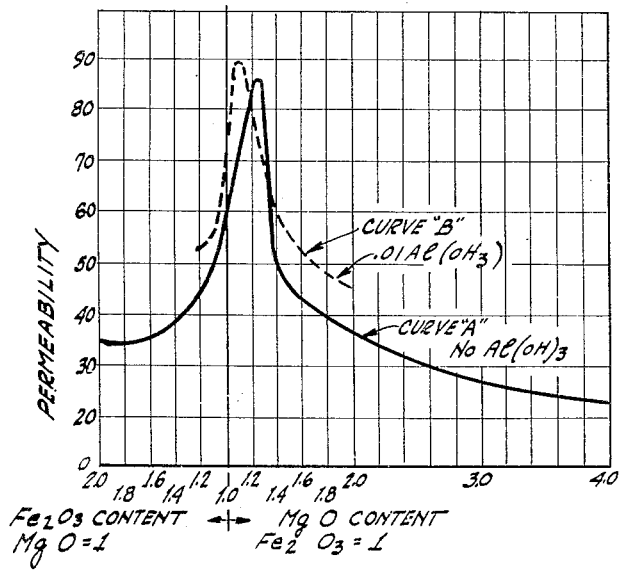

INVENTORS
Robert L. Harvey &
Humboldt W. Leverenz
BY
ATTORNEY

Patented Nov. 27, 1951

2,576,456

UNITED STATES PATENT OFFICE 2,576,456

MATERIALS OF HIGH MAGNETIC
PERMEABILITY

Robert L. Harvey and Humboldt W. Leverenz,
Princeton, N. J., assignors to Radio Corporation
of America, a corporation of Delaware Application December 31, 1946, Serial No. 719,594

7 Claims. (Cl. 252—625)

This invention relates to improved methods of preparation of materials having unusually high magnetic permeability and having, at the same time, other desirable electrical properties. The invention also relates to novel materials produced by the improved methods and to improved articles made of these materials.

Materials having high magnetic permeability are desirable in many practical applications. Most apparatus using radio frequency and intermediate frequency energy requires material of high permeability for use in core tuners, sleeves, shields, etc. One of the most important uses is in cores used as a trimmer adjustment for intermediate frequency and radio frequency circuits. Another application becoming increasingly important is the use of these materials in tuning cores to replace the tuning condenser in receivers. These cores must be of sufficient permeability to tune the radio frequency circuits over the entire broadcast or high frequency bands. Other applications of importance where these materials may be used are in television deflection yoke cores and high audio frequency transformers where laminated iron has excessive loss.

The materials out of which magnetically permeable cores have been made in the past have mostly been powdered magnetically permeable materials insulated and held together by a binder. The magnetic material generally used has been either powdered iron or powdered magnetic iron oxide. The binders have been various materials such as synthetic resins of the urea formaldehyde type. Partly because of the presence of the binder, even when limited to the smallest usable amounts, the available permeability of previously used cores was decidely limited. The presence of the binder between each particle of permeable material introduces a multitude of gaps into the magnetic path. For this reason, the permeability of this type of core could not be increased to any great extent, even if the permeability of the powder could be improved, since the results would still be limited by the presence of the binder.

Permeable cores made by processes previously used are also subject to another serious limitation, that is, inherent capacity loss. Attempts have been made to overcome this defect as described in Patent No. 2,283,925 of R. L. Harvey but further improvement in this respect is much to be desired.

The rapid broadening out of applications for radio frequency circuits, as for example, in the television field has made it increasingly desirable to extend the tuning range for permeable cores. Attempts to increase the tuning range by improvements on the conventional type of core have not been very successful because of the above mentioned limitations inherently present.

The main object of the present invention is to provide materials which can be used in the making of articles having greatly increased magnetic permeability.

Another object of the invention is to provide a composition of matter which, itself, has an unusually high degree of magnetic permeability.

Another object of the invention is to provide a composition of matter which has not only an unusually high degree of magnetic permeability but has also a high D.-C. resistance and low capacity loss when in compressed form.

Another object of the invention is to provide improved articles of manufacture having a greatly increased degree of magnetic permeability.

Another object is to provide improved articles of manufacture, at least part of which are made of materials having an improved degree of magnetic permeability and having no binder to maintain coherence.

Still another object is to provide novel methods of manufacture of magnetically permeable materials.

Figure 2:
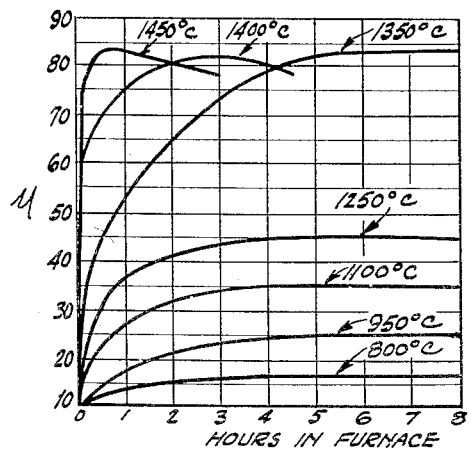
Figure 4:
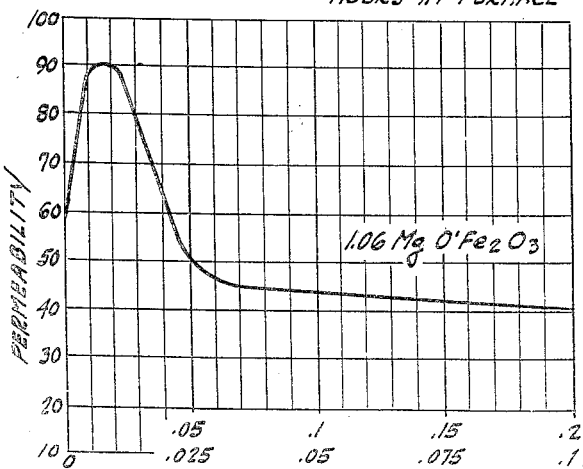
Figure 3:
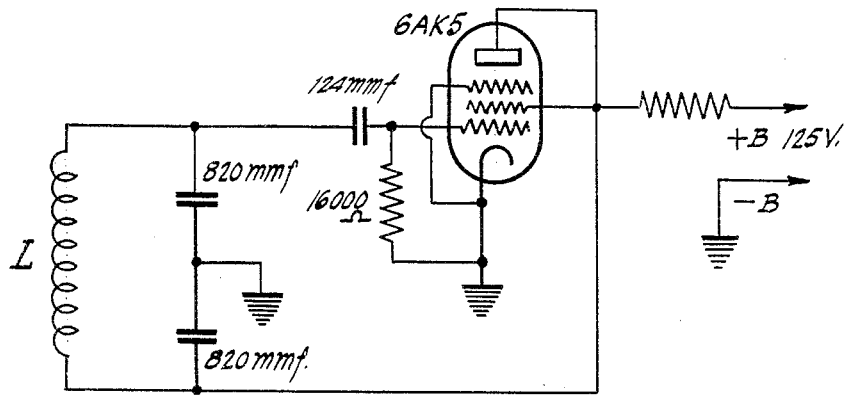
Figure 5:
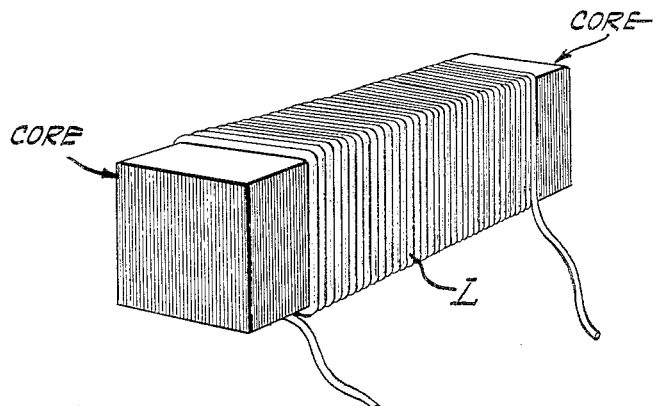

Other objects will be apparent and the invention will be more readily understood from a reading of the following specification and an inspection of the accompanying drawings of which:

Fig. 1 is a graph showing how the magnetic permeability of compressed cores of materials made according to the present invention varies with the basic composition, Fig. 2 is a graph showing how time and temperature of firing affect the permeability of the products obtained by the improved process, Fig. 3 is a circuit diagram of an oscillator used for testing certain properties of cores made of the improved materials, Fig. 4 is a graph showing how magnetic permeability of one composition of material made according to the invention changes with varied amounts of a particular addition agent, and Fig. 5 is a view in perspective of a tuning coil containing a core made according to the present invention.

Basically, the invention may be said to consist in the discovery of a composition of matter having an unexpectedly high degree of magnetic permeability when prepared in a particular manner. This composition may be prepared by treating an intimate mixture of magnesium and ferric oxides at elevated temperatures in an oxidizing atmosphere and then preferably cooling rapidly. The product which is formed closely resembles magnesium ferrite, having the chemical composition $MgO \cdot Fe_2O_3$ but appears to have a different ratio of oxygen combined in the molecule than is indicated by the usually assigned formula. The reasons why it is believed that a non-stoichiometric amount of oxygen is present are, first, that the compositions of matter do not have the desired properties unless the reaction is made to take place at a high temperature and in an oxidizing atmosphere. Secondly, the materials change greatly in appearance as the gaseous atmosphere containing oxygen is passed over the reaction mixture at high temperatures, and the final product is a rather hard, glossy black substance suggesting some reduction despite the treatment in the oxidizing atmosphere. Although, according to the available literature, magnesium ferrite having the formula $MgO \cdot Fe_2O_3$ may be prepared by heating a mixture of MgO and $Fe_2O_3$, the product produced as previously described does not show the high degree of magnetic permeability which has been found to be present in the product made according to the present invention. Hence, there appears to be a difference in molecular configuration between the products of the present invention on the one hand and magnesium ferrite prepared by previously known methods, on the other.

Specific examples of preparation of materials of the present invention will now be given.

Example 1

Magnesium oxide and ferric oxide in powdered form were mixed so that the amount of magnesium oxide present was 7.258 g. to 23.952 g. of ferric oxide. The powders were ball milled for 24 hours to obtain a completely homogeneous mixture.

A portion of the milled material was then heated in a muffle furnace for 1 hour at 900° C. in a blast of oxygen to partially react the ingredients.

The composition so produced was then ground in a mortar and screened. A portion of the screened material was placed in a mold and pressed into a desired shape using about 40,000 p. s. i. pressure.

Sample pressings were heated in a muffle furnace for 2 hours with oxygen continuously flowing through the furnace. Firing temperature was 1400° C.

The fired pressings were then removed from the furnace, cooled as rapidly as possible, e. g., by a blast of cold oxygen or air, or by plunging in water, and subsequently tested for magnetic permeability.

The pressings, which, in this case, were short bars having a rectangular cross section, were inserted in a test coil having an interior cavity of cylindrical cross section and into which the cores fit loosely. The permeability value $\mu$ for the coil, itself, was taken as 1, the value for air. The capacitance of the coil was 100 $\mu\mu$f., the Q value of the coil, with no core, was 67 and the resonating frequency was 2.2 megacycles. With the core inserted, the relative permeability rose to 8.6, the Q value was 56 and the capacitance was substantially unchanged. The absolute value for $\mu$ in these tests was found to be about 10 times the effective value as measured by the particular coil used; hence the absolute permeability of the cores was found to be $\mu=86$.

The composition of materials described in this example is a preferred form giving about the highest value of permeability obtained for mixtures containing only magnesium and ferric oxides. The molecular proportions of the ingredients before heating may be stated as 1.2 moles of MgO to 1 of $Fe_2O_3$ or $1.2MgO \cdot Fe_2O_3$.

Many other compositions containing varied proportions of magnesium oxide to ferric oxide were made up and tests made as described in the above example. It was found that whether the proportion of magnesium oxide to ferric oxide were raised or lowered from the value given in the example, the permeability of the compressed core was always less than for the proportion $1.2MgO \cdot Fe_2O_3$. The results of these tests are plotted as curve A of Fig. 1.

To list two more specific cases in which tests were made using the same coil as in Example 1, the composition $MgO \cdot 2Fe_2O_3$ (3.024 g. MgO–23.952 g. $Fe_2O_3$) produced cores having an effective $\mu$ value of 3.7 and a Q of 192 while the composition $2MgO \cdot Fe_2O_3$ (9.677 g. MgO–19.162 g. $Fe_2O_3$) produced cores having an effective $\mu$ value of 3.7 and a Q value of 47. In each case, the absolute value for $\mu$ is 10 times the effective value.

The temperature of heating the oxides appears to be fairly critical if the best results are to be obtained. The object is to heat the mixture long enough and at a sufficiently high temperature to both form the magnesium ferrite complex and enable it to establish the optimum proportions between oxygen on one hand and magnesium and iron on the other.

The exact time and temperature are variable with respect to each other. That is, the higher the temperature the less the heating time until a temperature has been reached when a further increase results in no shorter reaction time. In order to obtain the optimum increase in permeability of the material, it should be heated to at least 1350° C. In the examples of the type described, heating above this temperature shortens the time required but does not produce any further increase in permeability. At 1350° C. a heating time of at least 5 hours is preferred. Heating at temperatures of from below 1350° C. down to 950° C. produces improved results in the material treated but not the optimum. For example, when the heating temperature is reduced to 1250° C., the permeability of the product is reduced nearly 50 per cent and if the heating temperature is reduced to 950° C., the permeability of the product is only about ¼ of the optimum. This is illustrated graphically in Fig. 2 for one preferred example and is generally the same for other compostiions which had unusually high permeability when heated to about 1350° C.

One may use other magnesium or iron salts, such as carbonates or oxalates, which decompose to the oxide. Ferrous oxide may be used, but the ferric form gives somewhat better results.

Example 2

Although the combination of magnesium and ferric oxides in the form of the ferrite produces material which is highly satisfactory from the standpoint of permeability, it is also possible to vary the composition by adding small amounts of other materials such as oxides of certain trivalent metals other than iron. The addition of minor amounts of aluminum oxide, for example, produces a material having desirable mechanical properties and a slightly higher maximum permeability. When the aluminum oxide is added, however, the optimum proportions of magnesium oxide to ferric oxide change somewhat as shown by curve B of Fig. 1. This curve shows that for the addition of .01 mole of aluminum as hydroxide to the composition, the optimum proportions of the two main ingredients become about 1.06 moles of MgO to 1 mole of $Fe_2O_3$. Expressed in grams, the preferred initial composition for this modification is 6.411 g. MgO, 23.952 g. $Fe_2O_3$, and .117 g. $Al(OH)_3$. When a core was prepared from this material as in Example 1 and the core was tested in a coil, as described in that example, the effective permeability was found to be 8.9 and the Q value was 62. Curve B of Fig. 1 was plotted from samples, all of which contained the same amount of aluminum expressed as hydroxide, namely, .01 mole relative to 1 mole of iron oxide. The aluminum hydroxide decomposes to the oxide, which is present as 0.005 mole $Al_2O_3$ per mole of $Fe_2O_x$. In this case the "$x$" in the formula given for the iron oxide represents the proportion of oxygen with respect to iron in the molecular structure of the reaction product. Although it appears that the formula for the reaction product cannot be stated as including the usual 3 atoms of oxygen to every 2 atoms of iron, the exact proportions actually present are not exactly known and will vary with the time and temperature of heating and amount of oxygen present during the heat treating process. Time and temperature of heating were substantially the same as when no aluminum compound was present.

Other minor amounts of aluminum oxide may be used but in each case, in order to produce a material of optimum permeability, the percentages of the magnesium and ferric oxides change.

When the proportion of magnesium to iron oxide remains constant, the use of varying amounts of $Al_2O_3$ results in products having varying magnetic permeability. An illustration of this is shown graphically in Fig. 4. In this figure are plotted permeability values of cores made from a composition containing before heating $1.06MgO \cdot Fe_2O_3$ and varying amounts of $Al_2O_3$.

Oxides of trivalent metals other than aluminum may be added to the compositions of magnesium and ferric oxides to form materials having improved magnetic permeability. For instance, oxides of some of the metals chemically related to aluminum may be used as the following examples show:

Example 3

To a mixture of 7.258 g. MgO and 23.952 g. $Fe_2O_3$ was added 0.423 g. $Ga_2O_3$. In molar ratios, this corresponded to $1.2MgO \cdot Fe_2O_3 \cdot 0.03Ga_2O_3$. When treated as described in Example 1, a core of this material was found to have an effective $\mu$ of 7.8 and a Q of 47. The absolute value of $\mu$ was about 78.

Example 4

A mixture of 3.629 g. MgO, 11.976 g. $Fe_2O_3$, and 1.137 g. $Gd_2(C_2O_4)_3 \cdot 10H_2O$ was prepared as described in Example 1. The molar ratios of this composition were $$1.2MgO \cdot Fe_2O_3 \cdot 0.04Gd_2(C_2O_4)_3 \cdot 10H_2O$$

When measured as previously described, the effective $\mu=7.3$ and $Q=44$. The absolute value of $\mu$ is about 73. In this example, the gadolinium oxalate decomposes to form $Gd_2O_3$.

Benefits other than a slightly improved maximum permeability are derived from use of the addition agents such as aluminum, gallium, and gadolinium oxides. The use of these agents shifts the optimum composition of $MgO$—$Fe_2O_3$ into a region where the products have lower radio frequencey losses. In a circuit, this means a higher Q value.

The best range of amounts of the addition agents used is up to 0.10 mole of the agent, expressed as oxide, to 1 mole of $Fe_2O_3$ when an optimum proportion of MgO to $Fe_2O_3$ is used.

Tuning cores made up of material prepared according to the present invention show very considerable increase in certain desirable characteristics. For example, as indicated previously, the permeability is greatly increased and the tuning range is extended considerably as the following examples show:

Example 5

A test core was made up of ingredients having before heating the composition $$1.12MgO \cdot Fe_2O_3 \cdot .005Al_2O_3$$

The core was .112 inch square by $1\frac{11}{16}$ inches in length. The milled powder out of which it was made was first heated in oxygen for 1 hour at 900° C. and the pressed core was then heated in oxygen for 7 hours at 1400° C. It was tested in a coil which had inside dimensions of .125 inch square and 1.5 inches in length. This coil with the core inserted is shown in Fig. 5. The coil was wound from .007 inch diameter enamel wire. Without the core, the coil had a resonant frequency of 2.93 megacycles, a Q value of 36 and capacitance of 400 $\mu\mu f$. With the core, the resonant frequency was .553 megacycle, the Q value was 50 and the capacitance was 400 $\mu\mu f$. The effective permeability with the core was 28. In this case, since the dimensions of the coil were not the same as in previously described examples, the absolute value of permeability is not 10 times the effective value.

Example 6

A core was made up having the same composition and dimensions as in Example 3. A test coil similar, except as to dimensions, to that shown in Fig. 5, was prepared by winding 0.007 inch diameter enamelled wire on a square form. The coil had inside dimensions of ⅛ inch square and was ½ inch long. This core and coil were tested in the oscillator circuit shown in Fig. 3 with the core being inserted in the coil L. Tuning range of the oscillator obtained by means of the core was 1.12 megacycles to 4.78 megacycles.

From the above description and tabulations of results, it can be seen that materials have been produced which have permeabilities at radio frequencies considerably better than the best previously obtainable. Part of the improvement is due to the new compositions themselves having unusually high permeability and part is due to their needing no binder to hold the particles together. The improved permeability of the compositions appears to be due to the high concentration of ferromagnetic iron ions which are shielded from one another by interspersed oxygen (and magnesium or aluminum) ions; hence, the spins of the iron ions may be oriented individually at high frequencies, but it is not desired to be limited to this interpretation. An abundant supply of oxygen appears to be needed to minimize dissociation of the material at high temperature and atmospheric pressure. Higher pressures of oxygen allow better control of the optimum composition. Oxygen may conveniently be obtained by introducing a stream of oxygen into the reaction chamber but using pressures above atmospheric will reduce the amount of excess oxygen needed as well as reduce the time of heating required to complete the reaction.

Although the best results are obtained by heating the compositions in a stream of oxygen, significant improvement in permeability has also been obtained by heating in air alone. The increase in magnetic permeability of the product has not been as great as when heating in a stream of oxygen, however.

Techniques of forming shaped bodies having improved mechanical properties may be used other than that previously described. A pressed bar of the composition may be made up, heating at 1350 or 1400° C. as described. This may then be pulverized and re-formed into desired shape with a small amount of volatilizable organic binder such as 0.2 per cent of nitrocellulose. This may then be reheated at 1350 or 1400° C. The binder is completely driven off and the resultant body is stronger and has excellent dimensional uniformity.

Without re-pressing into core form after being heated once, the formed material may be pulverized and used as a high frequency energy absorbing shield by preferably mixing with a small amount of binder and coating on a surface. It may also be coated on the interior of a coil which may thus have its inductance adjusted.

As stated in the examples, preferred results have been obtained by rapid cooling of the product after the final heating has taken place. The cooling may be accomplished by means of an air or oxygen blast or, better still, by rapidly quenching in water. The increase in magnetic permeability of the product brought about by this step has been quite surprising and unexpected.

Another unexpected result found in the course of testing the products of the invention is that both their magnetic permeability and Q values are still further improved with a rise in the temperature at which they are used. When a core was made of a composition having the molar proportions $1.03MgO \cdot Fe_2O_3 \cdot 0.0015Al_2O_3$ and the core tested as described in Example 1, at 20° C., the core was found to have an effective permeability $\mu=7.7$ and $Q=59$. At 87° C., the value of $\mu$ had risen to 8.5 and Q had dropped to 10. On the other hand, a drop in temperature reversed the effect. At —123° C., the effective permeability dropped to 6 and the Q value rose to 75. From this, it appears that the performance of material made according to the present invention may be improved by using it at increased temperatures where this is practical.

There have thus been described compositions of matter having a magnetic permeability, at radio frequencies, which is considerably higher than that of those previously regarded as best in this field. There have also been described improved techniques for making these materials and improved shaped bodies made of the compositions. In addition, it has been shown how the shaped bodies made according to the invention may be used in constructing articles such as tuning coils which have a widely extended tuning range.

We claim as our invention:

1. A composition of matter comprising the reaction product produced by heating together at temperatures exceeding 950° C. in an oxygen-containing oxidizing atmosphere an intimate mixture of $Fe_2O_3$, MgO and at least one oxide of a trivalent metal from the class consisting of aluminum, gallium and gadolinium in which the molar ratio of $Fe_2O_3$ and MgO is from $2Fe_2O_3 \cdot MgO$ to $Fe_2O_3 \cdot 2MgO$ and the proportion of said trivalent metal oxide is from .0025 to about 0.1 mole per mole of $Fe_2O_3$.

2. A composition according to claim 1 in which said trivalent metal is aluminum.

3. A composition according to claim 2 in which the molar ratio of the three oxides is $Fe_2O_3 \cdot 1.06MgO \cdot 0.005Al_2O_3$ 4. A composition according to claim 3 in which the product is produced by heating the said mixture at a temperature of at least 1350° C.

5. A composition according to claim 1 in which said trivalent metal is gallium and in which the molar ratio of the three oxides is $Fe_2O_3 \cdot 1.2MgO \cdot 0.03Ga_2O_3$.

6. An article of manufacture characterized by having improved magnetic properties comprising a compressed body of material of predetermined shape, said material being a reaction product produced by heating together in an oxygen-containing oxidizing atmosphere at a temperature exceeding 950° C. an intimate mixture comprising $Fe_2O_3$, MgO and at least one oxide of a trivalent metal of the class consisting of aluminum, gallium and gadolinium in which the molar ratio of $Fe_2O_3$ and MgO is from $2Fe_2O_3 \cdot MgO$ to $2MgO \cdot Fe_2O_3$ and in which the proportion of said trivalent metal oxide is from .0025 to about 0.1 mole per mole of $Fe_2O_3$.

7. An induction coil core having improved magnetic permeability at radio frequencies, said core comprising a shaped body formed from a compressed quantity of a reaction product produced by heating together in an oxygen-containing oxidizing atmosphere at a temperature exceeding 950° C. an intimately compressed mixture comprising $Fe_2O_3$, MgO and at least one oxide of a trivalent metal of the class consisting of aluminum, gallium and gadolinium in which the molar ratio of $Fe_2O_3$ and MgO is from $2Fe_2O_3 \cdot MgO$ to $2MgO \cdot Fe_2O_3$ and in which the proportion of said trivalent metal oxide is from .0025 to about 0.1 mole per mole of $Fe_2O_3$.

ROBERT L. HARVEY.
HUMBOLDT W. LEVERENZ.

REFERENCES CITED

The following references are of record in the file of this patent:

UNITED STATES PATENTS

| Number | Name | Date |
| --- | --- | --- |
| 1,946,964 | Cobb | Feb. 13, 1934 |
| 1,997,193 | Kato et al. | Apr. 9, 1935 |
| 2,059,393 | Polydoroff | Nov. 3, 1936 |
| 2,064,771 | Vogt | Dec. 15, 1936 |
| 2,410,220 | Langworthy | Oct. 29, 1946 |

OTHER REFERENCES

Mellor: "Comprehensive Treatise on Inorg. & Org. Chem." (1934), vol. 13, pp. 914, 915, and 916. Copy in Scientific Lib.

Snoek: "Magnetic and Electrical Properties of the Binary Systems $MO \cdot Fe_2O_3$," Physica III, No. 6, June 1936, pp. 463–483.